(12) United States Patent  
Satake et al.

(10) Patent No.: US 12,449,523 B2
(45) Date of Patent: Oct. 21, 2025

(54) ULTRASONIC SENSOR

(71) Applicant: DENSO CORPORATION, Kariya (JP)

(72) Inventors: Masayoshi Satake, Nisshin (JP); Yu Koyama, Nisshin (JP); Tetsuya Aoyama, Kariya (JP); Mitsumasa Miyazaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 276 days.

(21) Appl. No.: 18/357,368

(22) Filed: Jul. 24, 2023

(65) Prior Publication Data

US 2023/0366999 A1 Nov. 16, 2023

Related U.S. Application Data

(63) Continuation of application No. PCT/JP2021/046051, filed on Dec. 14, 2021.

(30) Foreign Application Priority Data

Jan. 26, 2021 (JP) ................. 2021-010461

(51) Int. Cl.
*G01S 7/521* (2006.01)
*G01S 15/931* (2020.01)

(52) U.S. Cl.
CPC ............ *G01S 7/521* (2013.01); *G01S 15/931* (2013.01); *G01S 2015/938* (2013.01)

(58) Field of Classification Search
CPC .. G01S 7/521; G01S 15/931; G01S 2015/938; G01S 15/87; G01S 2007/52011; H04R 13/00; H04R 3/00
See application file for complete search history.

(56) References Cited

U.S. PATENT DOCUMENTS

| | | | | |
|---|---|---|---|---|
| 8,789,422 | B2* | 7/2014 | Ege | ............................ B06B 1/04 |
| | | | | 324/262 |
| 11,397,254 | B2* | 7/2022 | Ohashi | ..................... G01S 7/521 |
| 11,959,817 | B2* | 4/2024 | Yang | ................... G01N 29/2412 |
| 2005/0030840 | A1* | 2/2005 | Hagood | .................. G02B 6/022 |
| | | | | 369/44.14 |
| 2010/0242611 | A1* | 9/2010 | Terazawa | .............. G01S 15/931 |
| | | | | 73/629 |
| 2011/0259108 | A1* | 10/2011 | Ege | ..................... G01N 29/2412 |
| | | | | 73/643 |

(Continued)

FOREIGN PATENT DOCUMENTS

| | | |
|---|---|---|
| JP | H07-035846 A | 2/1995 |
| JP | 2013-130455 A | 7/2013 |
| JP | 2013-228225 A | 11/2013 |

*Primary Examiner* — Daniel L Murphy
*Assistant Examiner* — Amie N Ndure
(74) *Attorney, Agent, or Firm* — Maschoff Brennan (57) ABSTRACT

An ultrasonic sensor installable to a vehicle includes a magnetic body capable of ultrasonic vibration and an electric-magnetic converter having a conversion function between an oscillating magnetic field corresponding to the ultrasonic vibration of the magnetic body and an electric signal. The magnetic body is located on an outer surface side of an outer plate of the vehicle, which is the surface facing an external space of the vehicle. The electric-magnetic converter is located to face the magnetic body with the outer plate interposed therebetween on an inner surface side, which is a back surface of the outer surface of the outer plate.

9 Claims, 5 Drawing Sheets

(56) References Cited

U.S. PATENT DOCUMENTS

2016/0307726 A1* 10/2016 Hatakeyama ......... H01J 37/265
2017/0059697 A1   3/2017 Esmail
2018/0153508 A1*  6/2018 Kandori ................ B06B 1/0292

* cited by examiner

ULTRASONIC SENSOR

CROSS-REFERENCE TO RELATED APPLICATION

This application is the U.S. bypass application of International Application No. PCT/JP2021/046051 filed on Dec. 14, 2021 which designated the U.S. and claims priority to Japanese Patent Application No. 2021-010461 filed on Jan. 26, 2021, the contents of both of which are incorporated herein by reference.

TECHNICAL FIELD

The present disclosure relates to an ultrasonic sensor installed in vehicles.

BACKGROUND

Conventionally, there is a known technology for mounting an ultrasonic sensor to a vehicle bumper by inserting the ultrasonic sensor into a through-hole in the bumper (e.g., JP 2013-228225 A, etc.).

SUMMARY

According to one aspect of the present disclosure, an ultrasonic sensor installable to a vehicle includes:
  a magnetic body capable of ultrasonic vibration; and
  an electric-magnetic converter having a conversion function between an oscillating magnetic field corresponding to the ultrasonic vibration of the magnetic body and an electrical signal.
The magnetic body is located on an outer surface side of an outer plate of the vehicle, which is the surface facing an external space of the vehicle; and
  the electric-magnetic converter is located to face the magnetic body with the outer plate interposed therebetween on an inner surface side, which is a back surface of the outer surface of the outer plate.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

In order to mount a conventional ultrasonic sensor with the conventional configuration on a bumper, it is necessary to drill a mounting hole, a through-hole for mounting the ultrasonic sensor, in the bumper in advance. For this reason, ultrasonic sensor installed vehicles, which are vehicles that are shipped from the factory with ultrasonic sensors installed, are usually manufactured with bumpers that have pre-drilled holes. On the other hand, in order to retrofit ultrasonic sensors to non-ultrasonic sensor installed vehicles, which are vehicles that are shipped from the factory without ultrasonic sensors installed, mounting holes must be drilled after the fact in the bumpers for the non-ultrasonic sensor installed vehicles, which do not have mounting holes.

As described above, preparing bumpers for vehicles equipped with ultrasonic sensors that have mounting holes and bumpers for vehicles not equipped with ultrasonic sensors that do not have mounting holes will increase vehicle manufacturing costs. In addition, if bumpers for vehicles equipped with ultrasonic sensors are used on vehicles without ultrasonic sensors, since the bumpers for vehicles equipped with ultrasonic sensors have mounting holes, separate parts to cover the mounting holes may be required, and it may be difficult to distinguish from the exterior whether the vehicle is equipped with an ultrasonic sensor. Further, if mounting holes are drilled after the fact on bumpers for vehicles without ultrasonic sensors that do not have mounting holes in order to "retrofit" ultrasonic sensors, the cost of retrofitting increases due to the man-hours required to drill the mounting holes and the design of the bumper is degraded.

The present disclosure has been made in view of the circumstances and the like exemplified above. In other words, the present disclosure provides, for example, an ultrasonic sensor having a configuration that enables to be mounted on a vehicle body part without a through-hole in the vehicle body part, such as a bumper.

According to one aspect of the present disclosure, an ultrasonic sensor installable to a vehicle includes:
  a magnetic body capable of ultrasonic vibration; and
  an electric-magnetic converter having a conversion function between an oscillating magnetic field corresponding to the ultrasonic vibration of the magnetic body and an electrical signal.
The magnetic body is located on an outer surface side of an outer plate of the vehicle, which is the surface facing an external space of the vehicle; and
  the electric-magnetic converter is located to face the magnetic body with the outer plate interposed therebetween on an inner surface side, which is a back surface of the outer surface of the outer plate.

EMBODIMENTS

Embodiments of the present disclosure are described in the following referring to the accompanying drawings. Note that various modifications applicable to one embodiment may hinder the understanding of the embodiment if they are inserted in the middle of a series of explanations about the embodiment. For this reason, the modifications will not be inserted in the middle of the series of explanations regarding the embodiment, but will be explained collectively afterwards.

(Mounted Configuration)

Figure 1:
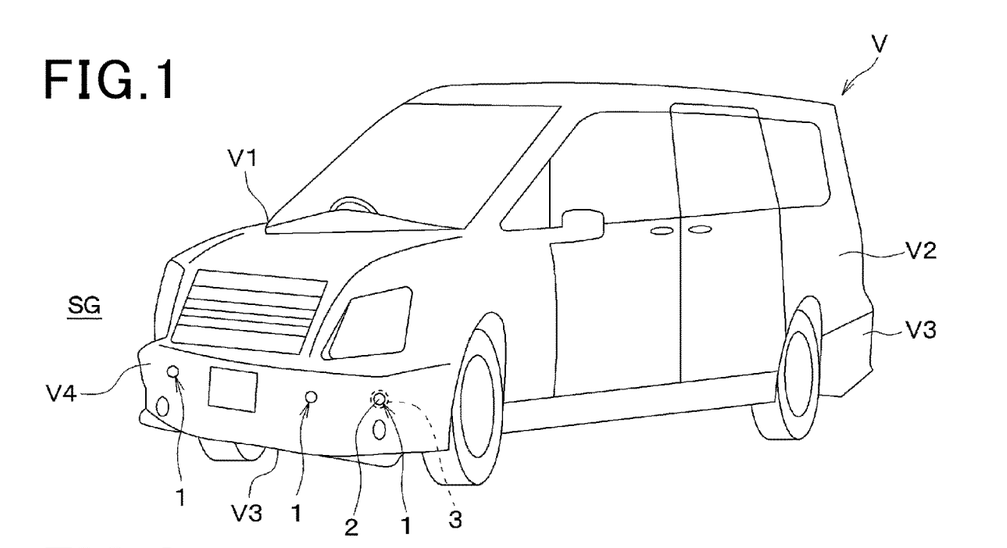
FIG. 1 shows a perspective view of an exterior of a vehicle equipped with an ultrasonic sensor of an embodiment.

Referring to FIG. 1, in the present embodiment, an ultrasonic sensor 1 is configured as an mounted clearance sonar with a vehicle V as a mounting target. In other words, the ultrasonic sensor 1 is configured to be installed in the vehicle V to enable detection of objects existing around the vehicle V.

The vehicle V is a so-called four-wheeled vehicle, and equipped with a box-shaped vehicle body V1. The vehicle body V1 is fitted with vehicle body panels V2 and bumpers V3, which are vehicle body parts that constitutes a vehicle outer plate. The bumper V3 is located at each of the front and rear ends of the vehicle body V1. The bumper V3 is formed of synthetic resin, which is a material that is permeable to magnetic flux.

The ultrasonic sensor 1 is configured to detect objects in an external space SG of the vehicle V by being attached to the bumper V3. A state in which the ultrasonic sensor 1 is mounted on vehicle V, i.e., bumper V3, is hereinafter referred to as an "mounted state".

Specifically, in the mounted state, a plurality of (e.g., four) ultrasonic sensors 1 are mounted on a front bumper, i.e., the bumper V3 on the front side of the vehicle body V1. The plurality of ultrasonic sensors 1 mounted on the front bumper are each located at different positions in a vehicle width direction. Similarly, although not shown, a plurality of (e.g., four) ultrasonic sensors 1 are mounted on a rear bumper, i.e., the bumper V3 on the rear side of the vehicle body V1.

In the present disclosure, the bumper V3 is not provided with mounting holes, which are through holes for mounting the ultrasonic sensor 1. In other words, the ultrasonic sensor 1 has a configuration that allows retrofitting without drilling mounting holes in the bumper V3 for vehicles not equipped with ultrasonic sensors, which are vehicles V that were once shipped from the factory without ultrasonic sensors being equipped. The details of the ultrasonic sensor 1 with such a configuration are described below.

First Embodiment

Figure 2:
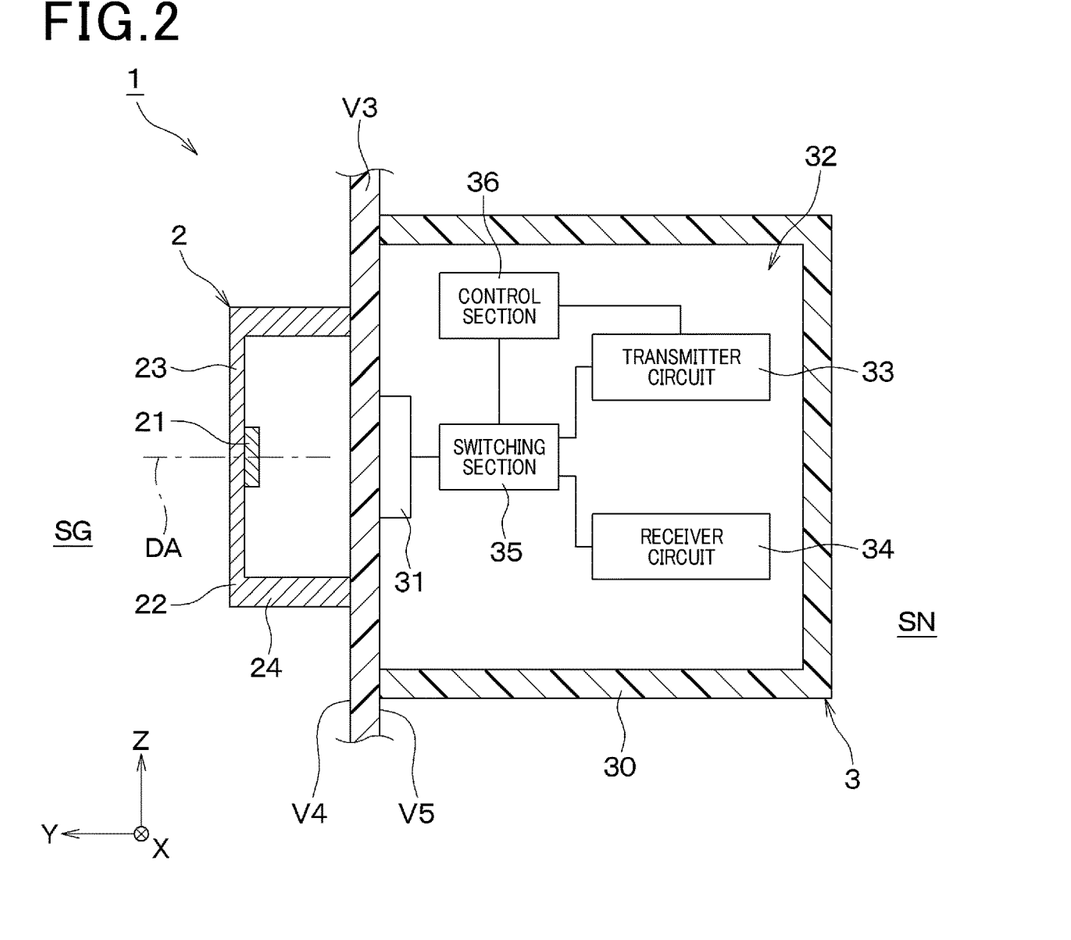
FIG. 2 shows an enlarged partial cross-sectional schematic view of a first embodiment of the ultrasonic sensor shown in FIG. 1.

FIG. 2 shows one of the pluralities of ultrasonic sensors 1 mounted on the bumper V3 in the mounted state. The configuration of the ultrasonic sensor 1 of the first embodiment is described below with reference to FIGS. 1 and 2.

In the present embodiment, the ultrasonic sensor 1 is configured to transmit and receive ultrasonic waves. In other words, the ultrasonic sensor 1 has an integrated transmitter/receiver configuration.

Specifically, the ultrasonic sensor 1 is configured to transmit probe waves, which are ultrasonic waves, along a directional axis DA toward the external space SG. The directional axis is an imaginary straight line extending from the ultrasonic sensor 1 along the direction of ultrasonic wave transmission and reception, and is a reference for a directional angle. The directional axis may also be referred to as a directional center axis or a detection axis. Further, the ultrasonic sensor 1 is configured to receive waves including reflected waves of probe waves by objects existing around the vehicle V from the external space SG, and to generate and output detection signals according to the reception results of the received waves.

For convenience of explanation, a right-handed XYZ Cartesian coordinate system is set up so that the Y axis is parallel to the directional axis DA and the Z axis is parallel to the vertical direction, i.e., the vehicle height direction, as shown in FIG. 2. At this time, a direction parallel to the directional axis DA is referred to as an axial direction. A "tip side in the axial direction" is a direction from which the probe waves is transmitted, and corresponds to the Y-axis positive direction in FIG. 2. In contrast, a "base end side in the axial direction" corresponds to the Y-axis negative side in FIG. 2. In addition, an end of a base of a component in the axial direction is referred to as a "base end" and an end of a tip of a component in the axial direction is referred to as a "tip".

Further, any direction orthogonal to the axial direction is referred to as an "in-plane direction. The "in-plane direction" is a direction parallel to the XZ plane in FIG. 2. The "in-plane direction" may also be referred to as a "radial direction" in some cases. The "radial direction" is a direction orthogonal to the directional axis DA and away from the directional axis DA. That is, when a half-line is drawn in the virtual plane orthogonal to the directional axis DA and starting from the intersection point of the virtual plane and the directional axis DA, the "radial direction" is a direction in which the half-line extends. In other words, the "radial direction" is a radial direction of a circle drawn in the virtual plane orthogonal to the directional axis DA and centered at the intersection point of the directional axis DA.

The bumper V3 has a bumper outer surface V4 and a bumper inner surface V5. The bumper outer surface V4 faces the external space SG, which is the space outside the vehicle V. The bumper inner surface V5 is a back surface of the bumper outer surface V4 and faces an inner space SN, which is a space inside the vehicle V, or the bumper V3.

The ultrasonic sensor 1 has an outer vibration section 2 and an inner circuit section 3. The outer vibration section 2 is disposed to face the external space SG in the mounted state. Specifically, the outer vibration section 2 is fixed on the bumper outer surface V4 by any fixing means, such as double-sided tape. The inner circuit section 3 is accommodated in the inner space SN in the mounted state.

The outer vibration section 2 includes a magnetic body 21 and a magnetic body support 22. The magnetic body 21 is a magnet or a solid of magnetic paint, and is formed in a shape of a pellet with a thickness direction in the axial direction. Specifically, in the present embodiment, the magnetic body 21 has a substantially circular in-plane shape centered on the directional axis DA. In other words, the magnetic body 21 is formed in a substantially disk shape. The magnetic body 21 is positioned on the bumper outer surface V4, which is the surface of the bumper V3 facing the external space SG, in the mounted state. In other words, the magnetic body 21 is supported by the magnetic body support 22 in such a way that it can be moved a small amount along the axial direction, thereby enabling ultrasonic vibration along the axial direction in the external space SG. The magnetic body support 22 is a component that supports the magnetic body 21 capable of ultrasonic vibration and has a diaphragm 23 and a diaphragm support 24.

The diaphragm 23 is formed as a thin plate having a thickness direction in the axial direction, and specifically, formed in a substantially flat plate having a substantially planar plate surface normal to the directional axis DA. Further, the diaphragm 23 has a substantially circular in-plane shape centered on the directional axis DA. In other words, the diaphragm 23 is formed in a substantially disk shape. The diaphragm 23 is disposed to support the magnetic body 21 in a fixed manner so that it vibrates ultrasonically while flexing and deforming together with the magnetic body 21, which vibrates ultrasonically in the axial direction. Specifically, the magnetic body 21 and diaphragm 23 are joined at the center of the diaphragm 23 in the in-plane direction by an adhesive or other arbitrary joining method. In the present embodiment, the magnetic body 21 is positioned between the diaphragm 23 and the inner circuit section 3 in the mounted state.

The diaphragm support 24 is designed to support the diaphragm 23 capable of ultrasonic vibration. Specifically, the diaphragm support 24 is formed in a cylindrical shape surrounding the directional axis DA. In more detail, the diaphragm support 24 has a substantially cylindrical shape with the directional axis DA as its axis center. The diaphragm support 24 is disposed to flexibly support the diaphragm 23 at its tip. In other words, the magnetic body support 22 is formed into a bottomed cylindrical shape by the diaphragm 23 and the diaphragm support 24.

The inner circuit section 3 has an inner case 30, an electric-magnetic converter 31, and a control circuit 32. The inner case 30, which constitutes a housing of the ultrasonic sensor 1, is formed in a box shape by insulating synthetic resin. The inner case 30 is configured to cover the electric-magnetic converter 31 and the control circuit 32 by being fixed on the bumper inner surface V5 with double-sided tape or any other fixing means.

The electric-magnetic converter 31 is positioned on the inner surface V5 side of the bumper, i.e., in the interior space SN, opposite the magnetic body 21 with the bumper V3 therebetween. Specifically, the electric-magnetic converter 31 is designed to be positioned in close proximity or contact with the bumper inner surface V5 in the mounted state.

The electric-magnetic converter 31 has a conversion function between the vibrating magnetic field corresponding to the ultrasonic vibration of the magnetic body 21 and an electrical signal. In other words, the electric-magnetic converter 31 is energized when the probe waves is transmitted, generating an oscillating magnetic field that causes the magnetic body 21 and diaphragm 23 to vibrate ultrasonically. In addition, the electric-magnetic converter 31 generates a receiving signal, which is an electrical signal corresponding to the ultrasonic vibration state of the magnetic body 21 at the time of reception. In the present embodiment, the electric-magnetic converter 31 is composed of an inductor such as a coil.

The control circuit 32 has a transmitter circuit 33, a receiver circuit 34, a switching section 35, and a control section 36 in its functional configuration. The transmitter circuit 33 is designed to apply transmission power to generate an oscillating magnetic field to the electric-magnetic converter 31 during transmission, when the magnetic body 21 is excited to transmit the probe waves. The receiver circuit 34 is designed to process the received signal generated at the electric-magnetic converter 31 by the reception of the received wave. The switching section 35 is configured to switch the application of transmission power from the transmitter circuit 33 to the electric-magnetic converter 31 and the input of the reception signal from the electric-magnetic converter 31 to the receiver circuit 34.

The control section 36 is an electronic circuit that controls the transmission and receptions in the ultrasonic sensor 1, and is capable of controlling the start and end timing of the probe waves transmission operation, the start and end timing of the reception operation, the probe wavestrength, etc. In other words, the control section 36 controls the switching timing in the switching section 35. Further, the control section 36, as the power control section, controls the applied power to the electric-magnetic converter 31.

Effects

The following is an overview of the operation of the ultrasonic sensor 1 of the present embodiment having the above configuration, together with the effects produced by the same configuration, with reference to the respective drawings.

At the time of transmission, when the probe waves is transmitted, transmission power is applied from the transmitter circuit 33 to the electric-magnetic converter 31. This causes an alternating current of a predetermined frequency to flow through the electric-magnetic converter 31. Then, an oscillating magnetic field of a predetermined frequency is generated in the electric-magnetic converter 31.

Here, the bumper V3 is interposed between the magnetic body 21 and the electric-magnetic converter 31. However, the bumper V3 is formed by a synthetic resin material that does not interfere with the electromagnetic interaction between the magnetic body 21 and the electric-magnetic converter 31. Therefore, electromagnetic interaction between the magnetic body 21 and the electric-magnetic converter 31 is possible even if the bumper V3 is interposed between the magnetic body 21 and the electric-magnetic converter 31. Accordingly, the oscillating magnetic field generated by the electric-magnetic converter 31 acts on the magnetic body 21, which is positioned opposite the electric-magnetic converter 31 with the bumper V3 therebetween. The magnetic body 21 then vibrates ultrasonically along the axial direction under the action of the vibrating magnetic field. This causes the diaphragm 23 to vibrate in the ultrasonic band while deflecting and deforming, and probe waves are transmitted from the diaphragm 23 to the external space SG along the directional axis DA.

During reception, the diaphragm 23 is excited by the received wave propagated from the external space SG to the diaphragm 23, causing the diaphragm 23 to deflect and deform while vibrating at a frequency in the ultrasonic band. The magnetic body 21 then vibrates ultrasonically along the axial direction. Thereby an oscillating magnetic field is generated along the directional axis DA.

Here, as described above, the electromagnetic interaction between the magnetic body 21 and the electric-magnetic converter 31 is possible even if the bumper V3 is interposed between the magnetic body 21 and the electric-magnetic converter 31. Thereby, the magnetic field vibration caused by the ultrasonic vibration along the axial direction of the magnetic body 21 acts on the electric-magnetic converter 31, which is positioned opposite the magnetic body 21 with the bumper V3 therebetween. Then, the oscillating magnetic field causes an induced current to flow in the electric-magnetic converter 31. In other words, the received signal, which is an electrical signal, is generated at the electric-magnetic converter 31. By processing such received signals in the receiver circuit 34, it is possible to detect objects corresponding to the reflected wave contained in the received wave.

Thus, according to the above configuration, it is possible to achieve good transmission and reception even when the bumper V3 is interposed between the magnetic body 21 and the electric-magnetic converter 31. In addition, the ultrasonic sensor 1 can be mounted on the bumper V3 without drilling a mounting hole, which is a through hole, in the bumper V3. Therefore, according to the present embodiment, it is possible to provide the ultrasonic sensor 1 having a configuration that can be mounted on the bumper V3 without having mounting holes in the bumper V3.

Second Embodiment

Figure 3:
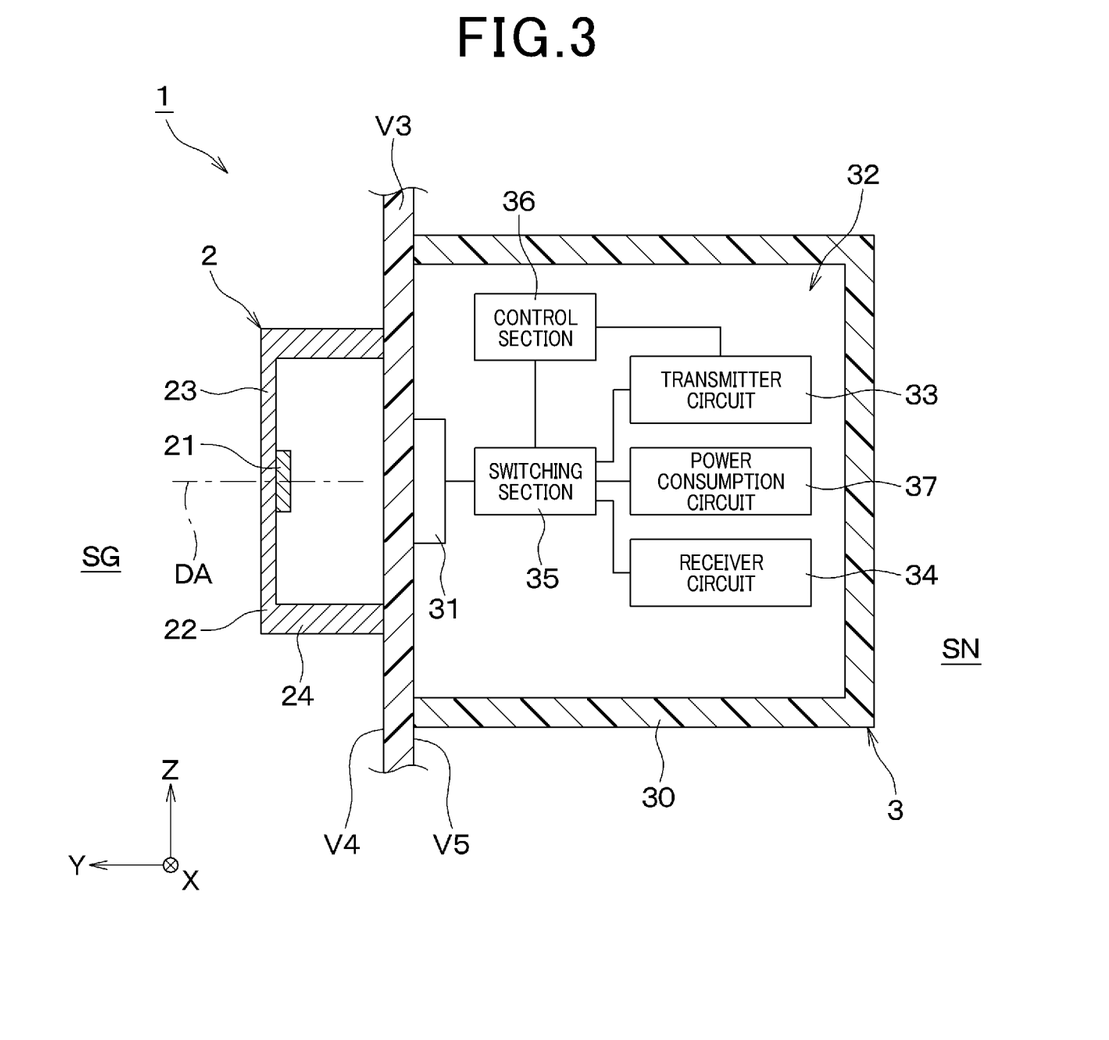
FIG. 3 shows an enlarged partial cross-sectional schematic view of a second embodiment of the ultrasonic sensor shown in FIG. 1.

The second embodiment will be described below with reference to FIG. 3. Note that in the following description of the second embodiment, components that differ from the first embodiment above will mainly be explained. In addition, in the first and second embodiments, components that are identical or equal are denoted with the same reference signs. Therefore, in the following description of the second embodiment, with respect to the components having the same reference signs as those of the first embodiment, the description in the first embodiment above may be incorporated as appropriate, unless there is any technical inconsistency or special additional explanation. The same applies to a third and subsequent embodiments described below.

In the present embodiment, a control circuit 32 has a transmitter circuit 33, a receiver circuit 34, a switching section 35, a control section 36, and a power consumption circuit 37 in its functional configuration. The power consumption circuit 37 is designed to consume the electrical energy of the oscillating current that flows through the electric-magnetic converter 31 after the transmission power is interrupted. The switching section 35 is configured to switch between the application of transmission power from the transmitter circuit 33 to the electric-magnetic converter 31, the consumption of electrical energy in the electric-magnetic converter 31 by the power consumption circuit 37, and the input of the reception signal from the electric-magnetic converter 31 to the receiver circuit 34.

In such a configuration, the electric energy of the vibration current that flows through the electric-magnetic converter 31 after the transmission power is cut off is consumed by the power consumption circuit 37, which allows good vibration control of the ultrasonic vibration of the magnetic body 21 and diaphragm 23. In other words, such a configuration allows good suppression of reverberation. Therefore, according to the present embodiment, the time between the interruption of the transmitting power and when the received wave can be received can be reduced well.

Third Embodiment

Figure 4:
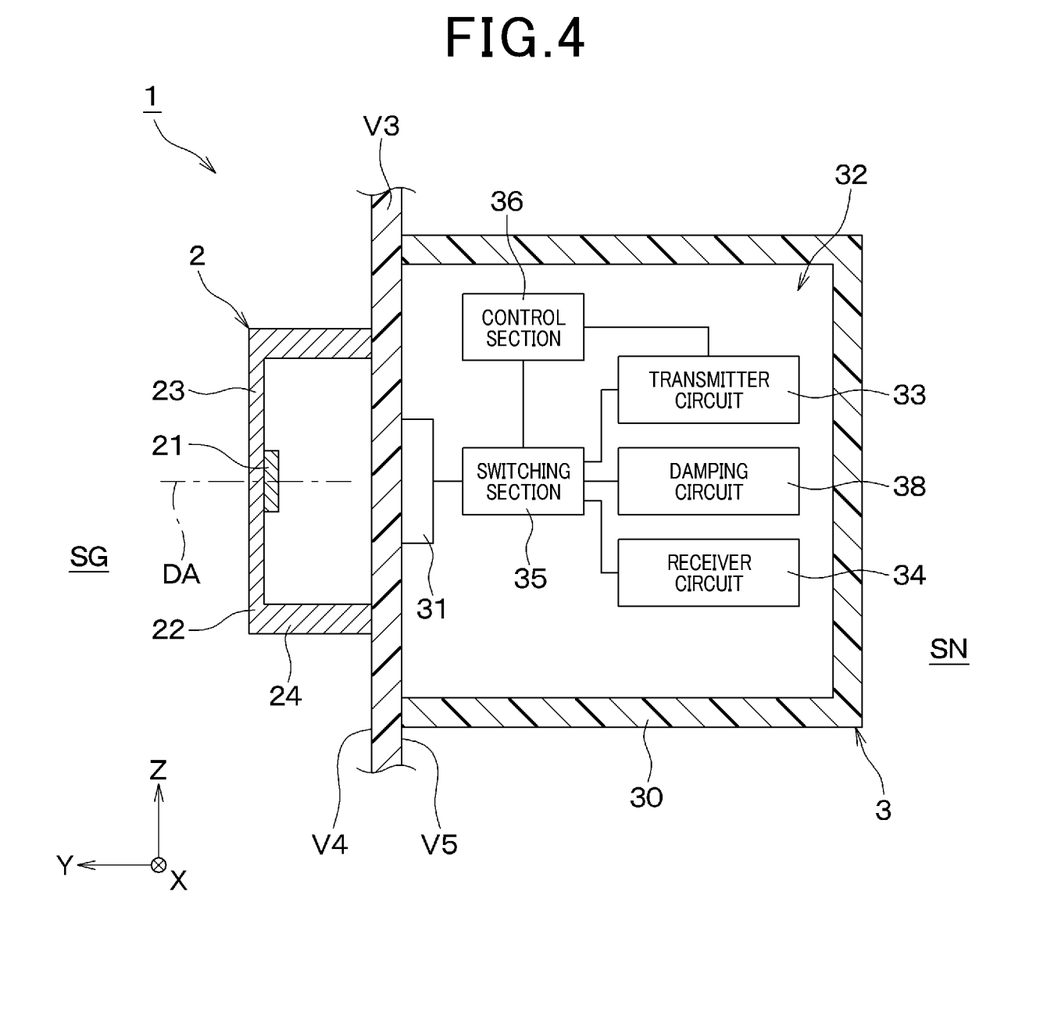
FIG. 4 shows an enlarged partial cross-sectional schematic view of a third embodiment of the ultrasonic sensor shown in FIG. 1.

The third embodiment is described below with reference to FIG. 4. Note that in the following description of the third embodiment, components that differ from the second embodiment above will be mainly explained.

In the present embodiment, a control circuit 32 has a transmitter circuit 33, a receiver circuit 34, a switching section 35, a control section 36, and a damping circuit 38 in its functional configuration. In other words, in the present embodiment, the damping circuit 38 is provided in place of the power consumption circuit 37 in the above second embodiment shown in FIG. 3.

The damping circuit 38 is provided to apply damping power to the electric-magnetic converter 31 in order to generate a magnetic field that damps the magnetic body 21 at the electric-magnetic converter 31 after the transmission power is shut off. In other words, the damping circuit 38 has the same configuration as the transmitter circuit 33, and by applying a vibration control power to the electric-magnetic converter 31, a vibration control magnetic field is generated by the electric-magnetic converter 31 to produce a vibration in the opposite phase of the vibration of the magnetic body 21 during transmission. The switching section 35 is configured to switch the application of transmission power from the transmitter circuit 33 to the electric-magnetic converter 31, the application of damping power from the damping circuit 38 to the electric-magnetic converter 31, and the input of received signals from the electric-magnetic converter 31 to the receiver circuit 34.

According to such a configuration, the same effect as in the second embodiment above is achieved. In other words, the damping of reverberation in the outer vibration section 2 is performed "passively" by power consumption in the second embodiment above, whereas it is performed "actively" by the application of antiphase vibration in the present embodiment. Therefore, according to the present embodiment, the time between the interruption of the transmitting power and when the received wave can be received can be reduced well.

Fourth Embodiment

Figure 5:
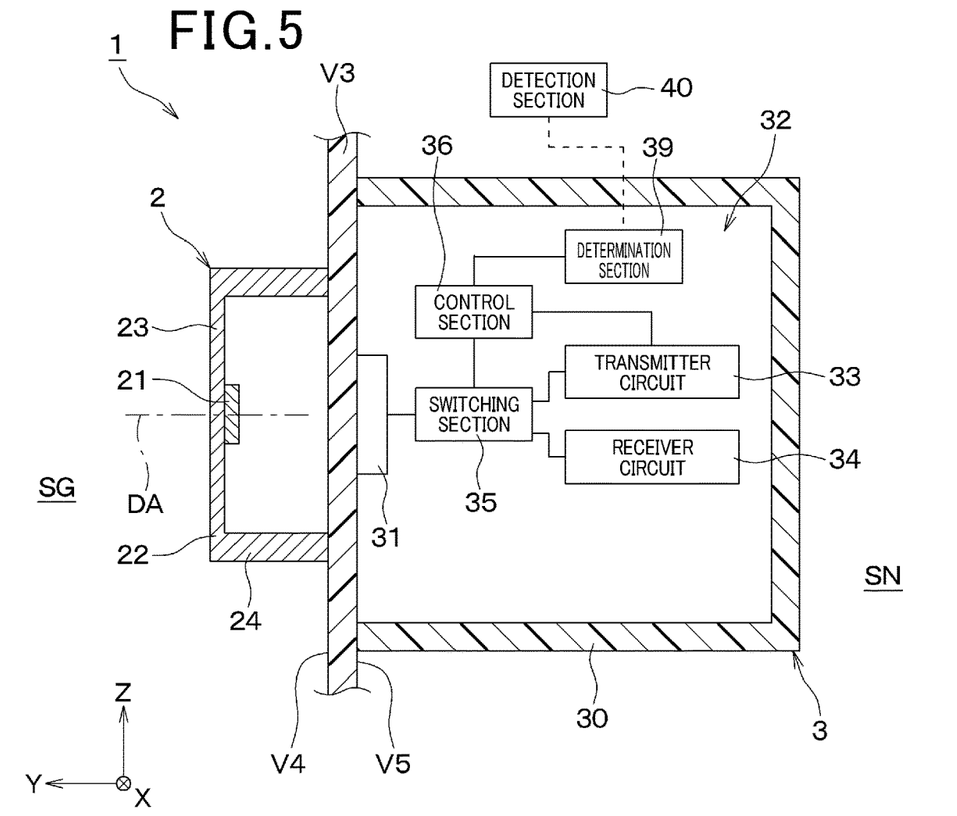
FIG. 5 shows an enlarged partial cross-sectional schematic view of a fourth embodiment of the ultrasonic sensor shown in FIG. 1.

The fourth embodiment is described below with reference to FIG. 5. In the present embodiment, a control circuit 32 has a transmitter circuit 33, a receiver circuit 34, a switching section 35, a control section 36, and a determination section 39 in its functional configuration.

The determination section 39 is provided to determine the occurrence of ice or snow accretion on the ultrasonic sensor 1, i.e., the outer vibration section 2. Specifically, the determination section 39 determines the occurrence of ice or snow accretion based on the detection results by a detection section 40. The detection section 40, for example, is configured to detect the occurrence of ice or snow accretion by means of capacitance changes. Alternatively, the detection section 40 is, for example, a physical quantity sensor that detects physical quantities such as temperature, humidity, etc. in the external space SG, and the determination unit 39 determines or estimates the occurrence of ice or snow accretion based on such physical quantities.

In the present embodiment, the control section 36 is configured to increase the applied power to the electric-magnetic converter 31 during the occurrence of ice or snow accretion than during non-occurrence of ice or snow accretion. In other words, the control section 36 increases the inductor current during the occurrence of ice or snow accretion more than during non-occurrence of ice or snow accretion. Alternatively, the control section 36 increases the inductor current when the likelihood of ice or snow accretion is high, compared to when such likelihood is low.

According to such a configuration, it is possible to melt ice or snow accreting to the ultrasonic sensor 1, i.e., the outer vibration section 2, or to suppress ice or snow from occurring by increasing the inductor current and heating the electric-magnetic converter 31. The determination section 39 and detection section 40 in the present embodiment can also be provided in the configuration of the second and third embodiments above.

Fifth Embodiment

The fifth embodiment is described below with reference to FIG. 6. The present embodiment is a partial transformation of the configuration of the outer vibration section 2 in each of the above embodiments. The same applies to a sixth embodiment, etc., described below.

In the present embodiment, a diaphragm 23 is formed in a shape having a longitudinal direction in the in-plane direction. Specifically, the diaphragm 23 is formed in the shape of an ellipse.

In more detail, the diaphragm 23 has the longitudinal direction in the vehicle height direction, i.e., in the Z-axis direction. Specifically, the diaphragm 23 is formed such that a first diaphragm dimension LD1 (i.e., a first dimension) is longer than a second diaphragm dimension LD2 (i.e., a second dimension). The first diaphragm dimension LD1 is the dimension of the diaphragm 23 in the vehicle height direction (i.e., in a first in-plane direction), which is orthogonal to the thickness direction of the diaphragm 23. The second diaphragm dimension LD2 is the dimension of the diaphragm 23 in the horizontal direction (i.e., in a second in-plane direction), which is orthogonal to the vehicle height direction and the thickness directions of the diaphragm 23.

In addition, in the present embodiment, the magnetic body 21 is located at the center of the diaphragm 23 in the in-plane direction. Specifically, the magnetic body 21 is formed in a substantially circular shape of which an outer shape in a plane perpendicular to the thickness direction of the diaphragm 23 is concentric with an outer shape of the diaphragm support portion 24 in the same plane.

In such a configuration, the directional angle in the YZ plane in the figure can be narrower than the directional angle in the XY plane in the figure. This enables good suppression of false detection caused by road surface reflection.

Sixth Embodiment

The sixth embodiment is described below with reference to FIG. 7. In the present embodiment, a magnetic body 21 is formed in a shape having a longitudinal direction in the in-plane direction. Specifically, the magnetic body 21 is formed in the shape of an ellipse. In more detail, the magnetic body 21 has a longitudinal direction in the vehicle height direction, i.e., in the Z-axis direction. Specifically, the magnetic body 21 is formed so that a first magnetic dimension LM1 (i.e., a first dimension) is longer than a second magnetic dimension LM2 (i.e., a second dimension). The first magnetic dimension LM1 is the dimension of the magnetic body 21 in the vehicle height direction (i.e., in the first in-plane direction), which is orthogonal to the thickness direction of the diaphragm 23. The second magnetic dimension LM2 is the dimension of the magnetic body 21 in the horizontal direction (i.e., in the second in-plane direction), orthogonal to the thickness direction of the diaphragm 23 and the vehicle height direction.

In the present embodiment, the magnetic body 21 is located at the center of the diaphragm 23 in the in-plane direction. Specifically, the diaphragm 23 has a substantially circular shape in the plane perpendicular to the thickness direction. Then, the magnetic body 21 is provided so that its center in the in-plane direction is substantially aligned with the center of the diaphragm 23 in the in-plane direction.

In such a configuration, the same effects as in the fifth embodiment above can be obtained. In other words, according to the present embodiment, by making the directional angle in the YZ plane in the figure narrower than the directional angle in the XY plane in the figure, false detection caused by road surface reflection can be well suppressed from occurring.

Seventh Embodiment

The seventh embodiment is described below with reference to FIG. 8. In the present embodiment, a magnetic body 21 is located offset in the radial direction from the center of a diaphragm 23 in a plane perpendicular to the thickness direction of the diaphragm 23. Specifically, the magnetic body 21 is bonded to the diaphragm 23 at a position offset vertically downward from the center of the diaphragm 23.

In such a configuration, the same effects as in the fifth and sixth embodiments above can be obtained. In other words, according to the present embodiment, asymmetric directivity is realized for the vertical up and down direction, which enables good suppression of road surface reflection and false detection caused by it.

Modifications

The present disclosure is not limited to the above embodiments. Therefore, modifications can be made to the above embodiments as appropriate. Typical modifications are described below. In the following description of the modifications, the differences from the above embodiment are mainly explained. In addition, in the above embodiments and modifications, components that are identical or equal are denoted with the same reference signs. Therefore, in the description of the following modifications, the description in the above embodiment may be aided as appropriate for components that have the same reference signs as those in the above embodiment, unless there is a technical inconsistency or a special additional explanation.

The mounting target of the ultrasonic sensor 1 is not limited to the bumper V3. Specifically, for example, the ultrasonic sensor 1 may also be mounted on the vehicle body panel V2 if the vehicle body panel V2 is formed of a material that does not interfere with the electromagnetic interaction between the magnetic body 21 and the electric-magnetic converter 31 (e.g., synthetic resin). In other words, there are no particular limitations on the materials that form the vehicle body parts to which the ultrasonic sensor 1 is attached, e.g., the vehicle body panels V2 and/or bumpers V3, as long as the materials do not interfere with the electromagnetic interaction between the magnetic body 21 and the electric-magnetic converter 31. Such "magnetic flux permeable material" may also be referred to as "magnetic flux transmitting material" or "material that does not shield magnetic flux. Such materials may typically be non-magnetic bodies (e.g., non-metallic materials such as synthetic resins) that do not contain additive components (e.g., fillers) made of magnetic bodies such as iron.

The ultrasonic sensor 1 is not limited to an integrated transmitter/receiver configuration. That is, for example, the ultrasonic sensor 1 may have a configuration that can only transmit ultrasonic waves. Alternatively, the ultrasonic sensor 1 may only have the function of receiving reflected waves by objects in the surroundings of the probe waves, which is ultrasonic wave transmitted from other ultrasonic transmitters. Alternatively, the ultrasonic sensor 1 may respectively have outer vibration sections 2 for transmitting and outer vibration sections 2 for receiving.

The configuration of each part in the ultrasonic sensor 1 is also not limited to the specific examples above. Specifically, for example, the in-plane shape of the magnetic body 21 is not limited to a substantially circular shape, but may be polygonal, such as square, hexagonal, octagonal, etc., or even elliptical. The same applies to the in-plane shape of the diaphragm 23.

The shape of the diaphragm support 24 is also not limited to a substantially cylindrical shape, but may be, for example, a square cylindrical shape, hexagonal cylindrical shape, octagonal cylindrical shape, or other cylindrical shape. Alternatively, the shape of the diaphragm support 24 is not limited to a cylindrical shape. That is, for example, the diaphragm support 24 may be a plurality of rod-like or leg-like portions extending axially from an outer edge in the in-plane shape of the diaphragm 23.

The diaphragm 23 and the diaphragm support 24 may be formed of the same material or of different materials from each other. The diaphragm 23 and the diaphragm support 24 may be seamlessly formed as one piece, or they may be formed separately from each other and then joined.

As for the configuration of the control circuit 32, the specific examples shown in the figures are only for convenience in simplifying the disclosure. Therefore, the configuration of control circuit 32 is not limited to the specific examples shown in the figures. That is, for example, the control circuit 32 is not limited to a configuration in which the electrical connection between the electric-magnetic converter 31 and the transmitter circuit 33, and between the electric-magnetic converter 31 and the receiver circuit 34 are switched by the switching section 35. Specifically, in the configuration shown in FIG. 2, the switching section 35 may be omitted.

Figure 6:
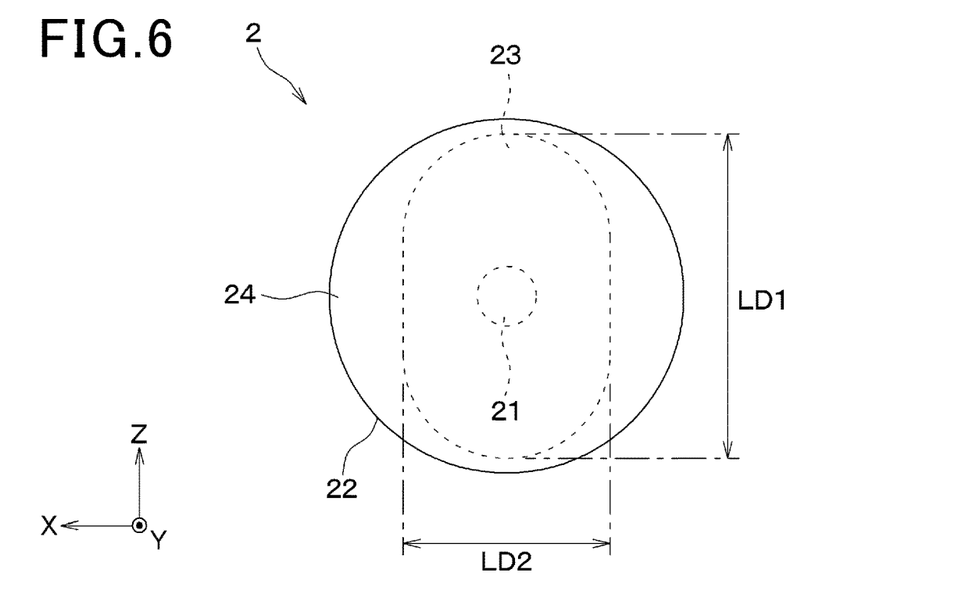
FIG. 6 shows a front view of a schematic configuration of an outer vibration section provided in an ultrasonic sensor of a fifth embodiment.
Figure 7:
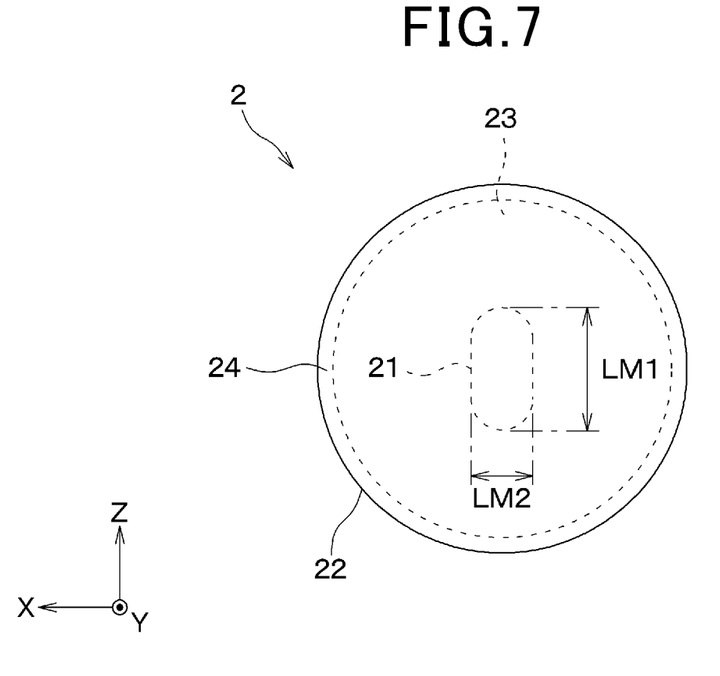
FIG. 7 shows a front view of a schematic configuration of an outer vibration section provided in an ultrasonic sensor of a sixth embodiment.
Figure 8:
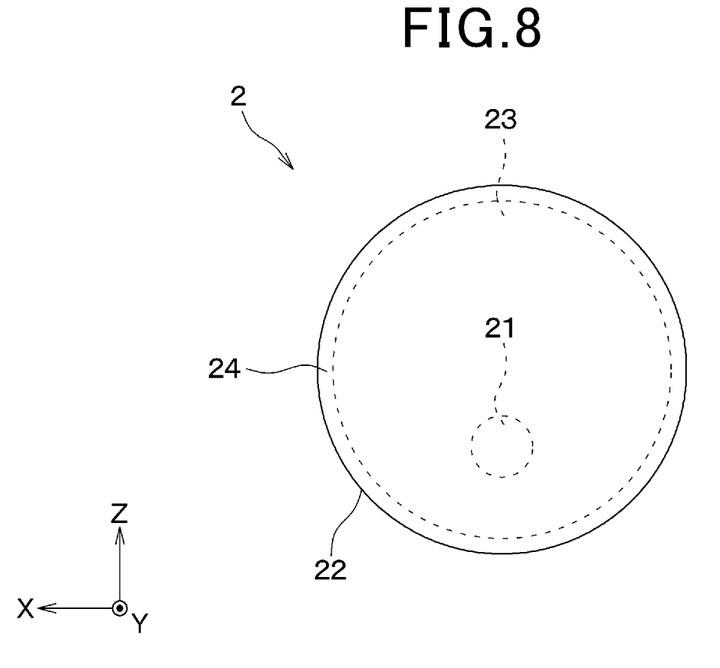
FIG. 8 shows a front view of a schematic configuration of an outer vibration section provided in an ultrasonic sensor of a seventh embodiment.

The in-plane shape of the magnetic body 21 in FIGS. 6 and 8 may have a longitudinal direction as shown in FIG. 7. The in-plane shape of the diaphragm 23 in FIG. 8 may have a longitudinal direction as shown in FIG. 6. In other words, the fifth to seventh embodiments can be combined with each other.

Without saying that the elements constituting the above embodiments are not necessarily essential, except when expressly stated as being particularly essential, or when they are clearly essential in principle, etc. In addition, when numerical values of the number, amount, range, etc., of components are mentioned, the disclosure is not limited to those specific values, except when specifically stated as essential or when clearly limited in principle to a specific value. Similarly, when the shape, direction, positional relationship, etc. of components, etc. are mentioned, the disclosure is not limited to such shape, direction, positional relationship, etc., except when expressly stated as being particularly essential or when limited to a specific shape, direction, positional relationship, etc. in principle.

Modifications are also not limited to the above examples. That is, for example, a plurality of embodiments, other than those exemplified above, may be combined with each other as long as they are not technically inconsistent. Similarly, multiple modifications may be combined with each other as long as they are not technically inconsistent.

What is claimed is:

1. An ultrasonic sensor installable to a vehicle comprising:
    a magnetic body capable of ultrasonic vibration; and
    an electric-magnetic converter having a conversion function between an oscillating magnetic field corresponding to the ultrasonic vibration of the magnetic body and an electrical signal; wherein
    the magnetic body is located on an outer surface side of an outer plate of the vehicle, which is the surface facing an external space of the vehicle; and
    the electric-magnetic converter is located to face the magnetic body with the outer plate interposed therebetween on an inner surface side, which is a back surface of the outer surface of the outer plate.

2. The ultrasonic sensor according to claim 1, wherein the electric-magnetic converter includes an inductor.

3. The ultrasonic sensor according to claim 2, wherein a power control section is further provided to control the power applied to the inductor, and
    the power control section increases the applied power when ice or snow accretion occurs, compared to when ice or snow accretion does not occur.

4. The ultrasonic sensor according to claim 2, further comprising:
    a transmitter circuit provided to apply transmission power to the inductor when transmitting ultrasonic waves by exciting the magnetic body; and
    a power consumption circuit provided to consume the electrical energy of the oscillating current that flows through the inductor after interruption of the transmission power.

5. The ultrasonic sensor according to claim 2, further comprising:
    a transmitter circuit provided to apply transmission power to the inductor for transmitting ultrasonic waves by exciting the magnetic body; and
    a damping circuit provided to apply damping power to the inductor to generate a magnetic field that damps the magnetic body at the inductor after interruption of the transmission power.

6. The ultrasonic sensor according to claim 1, wherein a magnetic body support is further provided to support the magnetic body capable of ultrasonic vibration;
    the magnetic body support includes a diaphragm formed in a thin plate shape, which fixedly supports the magnetic body so that the diaphragm vibrates ultrasonically while flexing and deforming together with the magnetic body that vibrates ultrasonically; and
    a diaphragm support that supports the diaphragm capable of ultrasonic vibration.

7. The ultrasonic sensor according to claim 6, wherein defining a direction orthogonal to a thickness direction of the diaphragm as a first in-plane direction;
    defining a direction orthogonal to the thickness direction and the first in-plane direction as a second in-plane direction;
    defining a dimension of the diaphragm in the first in-plane direction as a first dimension; and
    defining a dimension of the diaphragm in the second in-plane direction as a second dimension;
    the diaphragm is formed in a shape having a longitudinal direction in the first in-plane direction so that the first dimension is longer than the second dimension.

8. The ultrasonic sensor according to claim 6, wherein the magnetic body is located offset from the center of the diaphragm in a plane perpendicular to the thickness direction of the diaphragm.

9. The ultrasonic sensor according to claim 6, wherein defining a direction orthogonal to a thickness direction of the diaphragm as a first in-plane direction;
    defining a direction orthogonal to the thickness direction and the first in-plane direction as a second in-plane direction;
    defining a dimension of the magnetic body in the first in-plane direction as a first dimension; and
    defining a dimension of the magnetic body in the second in-plane direction as a second dimension;
    the magnetic body is formed in a shape having a longitudinal direction in the first in-plane direction so that the first dimension is longer than the second dimension.

* * * * *